United States Patent
Eichenauer et al.

[11] Patent Number: 5,674,939
[45] Date of Patent: Oct. 7, 1997

[54] ABS MOULDING COMPOUNDS WITH NOVEL MORPHOLOGY

[75] Inventors: Herbert Eichenauer, Dormagen; Adolf Schmidt, Köln; Edgar Leitz, Dormagen; Karl-Erwin Piejko, Bergisch Gladbach, all of Germany

[73] Assignee: Bayer Aktiengesellschaft, Leverkusen, Germany

[21] Appl. No.: 557,359

[22] Filed: Nov. 13, 1995

[30] Foreign Application Priority Data

Nov. 24, 1994 [DE] Germany ............ 44 41 846.9

[51] Int. Cl.$^6$ .................... C08L 55/02; C08L 51/04
[52] U.S. Cl. .................... 525/64; 525/66; 525/67; 525/69; 525/73; 525/83; 525/84; 525/86; 525/316
[58] Field of Search .................... 525/64, 66, 67, 525/69, 73, 84, 83, 316, 86

[56] References Cited

U.S. PATENT DOCUMENTS

| | | | |
|---|---|---|---|
| 4,292,233 | 9/1981 | Binsack et al. | 524/494 |
| 5,286,792 | 2/1994 | Wu et al. | 525/316 |
| 5,428,106 | 6/1995 | Schrader et al. | 525/71 |

FOREIGN PATENT DOCUMENTS

| | | |
|---|---|---|
| 0 166 330 | 8/1984 | European Pat. Off. |
| 12 47 665 | 8/1967 | Germany. |

OTHER PUBLICATIONS

English Abstract of DE 2038738-A (Orbit File WPAT).

*Primary Examiner*—Mark L. Warzel
*Attorney, Agent, or Firm*—Connolly and Hutz

[57] ABSTRACT

Moulding compounds the ABS type consisting of at least one resin matrix and a particulate graft-rubber polymer distributed therein and produced by emulsion polymerisation, wherein at least 70% of the graft-rubber particles (number) exhibit a structure of the rubber phase which can be detected by photographs taken with the aid of a transmission electron microscope and in which the individual particles contain irregular cellular inclusions of resin-forming polymer and the surface of the particles exhibits an irregularly jagged structure such that, for each particle illustrated, 5 to 30 of such jagged projections are present which differ from an idealised round particle (with a diameter d) by virtue of a diameter d+d/x with x=3 to 15, as well as a process for the manufacture of said moulding compounds.

8 Claims, 5 Drawing Sheets

ABS MOULDING COMPOUNDS WITH NOVEL MORPHOLOGY

BACKGROUND OF THE INVENTION

ABS moulding compounds have been used for many years in large quantities as thermoplastic resins for the production of moulded parts of all types. The spectrum of properties of these resins ranges from relatively brittle to highly viscous.

ABS products of high viscosity can be produced using emulsion ABS only if large quantities of rubber are used; but such quantities are associated with disadvantages as regards other properties, in particular hardness, dimensional stability when subject to heat and thermoplastic flowability.

The aim is therefore to make available ABS moulding compounds of specified high viscosity (requirement profile) and a rubber content that is as low as possible without incurring the disadvantages described above.

Within certain limits ABS moulding compounds with good viscosity values and relatively low rubber contents can be obtained by the use of so-called solution ABS or mass ABS; but such products are not suitable for all fields of application (eg, not for moulded parts with high lustre requirements, such as casings or telephone parts).

SUMMARY OF THE INVENTION

It has been found that ABS polymers produced by emulsion polymerisation and having high viscosity with relatively low rubber contents (comparable to those of mass ABS) are obtained if the rubber phase exhibits a special jagged structure.

The object of the invention is constituted by moulding compounds of the ABS type consisting of at least one resin matrix and a particulate graft-rubber polymer distributed therein and produced by emulsion polymerisation, characterised in that at least 70% of the graft-rubber particles (number), preferably at least 80% of the graft-rubber particles (number) and in particular at least 90% of the graft-rubber particles (number) exhibit a structure of the rubber phase which can be detected by photographs taken with the aid of a transmission electron microscope and in which the individual particles contain irregular cellular inclusions of resin-forming polymer and the surface of the particles exhibits an irregularly jagged structure such that, for each particle illustrated, 5 to 30, preferably 7 to 25 and in particular 10 to 20 of such jagged projections are present which differ from an idealised round particle (with a diameter d) by virtue of a diameter d+d/x with x=3 to 15, preferably 4 to. 12 and in particular 5 to 10.

DESCRIPTION OF THE DRAWINGS

FIGS. 1(A)–1(C) show electron micrographs at different magnifications of the compound described in Example 1.

FIGS. 2(A)–2(C) show electron micrographs at different magnifications of the compound described in Example 3.

FIGS. 3(A)–3(C) show electron micrographs at different magnifications of the compound described in Example 5.

FIGS. 4(A)–4(C) show electron micrographs at different magnifications of the compound described in Example 7.

FIGS. 5(A)–5(C) show electron micrographs at different magnifications of the compound described in comparative Example 9.

DESCRIPTION OF PREFERRED EMBODIMENTS

A preferred embodiment of the moulding compounds of the ABS type according to the invention is characterised in that they exhibit, with an overall rubber content of 12 to 18 wt-% and a weight-average molecular weight ($\overline{M}_w$) of the resin matrix of $\overline{M}_w$=75,000 to $\overline{M}_w$=125,000, an impact strength at room temperature (according to ISO 180/1A) of at least 30 kJ/m$^2$, preferably at least 33 kJ/m$^2$ and in particular at least 35 kJ/m$^2$, a hardness (according to DIN 53 456) of at least 90 N/mm$^2$, preferably at least 94 N/mm$^2$ and in particular at least 96 N/mm$^2$, and a surface lustre (according to DIN 67 530, reflectometer value) of at least 80, preferably at least 83 and in particular at least 85.

A further object of the present invention is a process for the production of graft-rubber particles with a structure described above by graft polymerisation of resin-forming monomers in the presence of at least one rubber that is available in emulsion form with a swelling index $\geq 30$, preferably $\geq 40$ and in particular $\geq 50$ (in toluene) in such a way that during 25 to 90%, preferably 30 to 80% and in particular 35 to 75% of the overall reaction time in the reaction mixture a quantity of 5 to 70 wt-%, preferably 7.5 to 60 wt-% and in particular 10 to 50 wt-% (relative to the total monomer employed up until the time in question) of non-reacted monomer is present.

The rubbers used in accordance with the invention must have a glass temperature below 0° C. Suitable, for example, are:

diene rubbers—that is, homopolymers of conjugated dienes with 4 to 8 C atoms such as butadiene, isoprene, chloroprene or copolymers thereof with up to 60 wt-%, preferably 1 to 30 wt-%, of a vinyl monomer—.eg, acrylonitrile, methacrylonitrile, styrene, α-methylstyrene, halogen styrenes, $C_1$–$C_4$ alkyl styrenes, $C_1$–$C_6$ alkyl acrylates and methacrylates, alkylene glycol diacrylates and dimethacrylates and also divinylbenzene;

acrylate rubbers—that is, homopolymers and copolymers of $C_1$–$C_{10}$ alkyl acrylates—eg, homopolymers of ethyl acrylate, butyl acrylate, 2-ethylhexyl acrylate or copolymers with up to 40 wt-%, preferably no more than 10 wt-% monovinyl monomers—eg, styrene, acrylonitrile, vinylbutyl ether, acrylic acid (ester), methacrylic acid (ester), vinylsulphonic acid. Preferably such acrylate rubber homopolymers or copolymers are used that contain 0.01 to 8 wt-% divinyl or polyvinyl compounds and/or derivatives of N-methylolacrylamide (or N-methylolmethacrylamide) which act as crosslinking agents—eg, divinylbenzene, triallylcyanurate, and whereby the rubber contains C=C double bonds;

terpolymer rubbers—that is, copolymers of mono-olefinic hydrocarbons—eg, ethylene, propylene and dienes— eg, butadiene, cyclopentadiene.

Preferred are polybutadiene rubbers and SBR rubbers with up to 30 wt-% styrene incorporated by polymerisation, polybutadiene being particularly preferred.

The rubber polymers to be used in accordance with the invention exhibit swelling indices (in toluene) $\geq 30$, preferably $\geq 40$ and in particular $\geq 50$. In this regard the swelling indices are determined in the following way:

1 g of dry, stabilised, finely-cut rubber is mixed with 100 cm$^3$ toluene and agitated for 24 h in a brown flask. Then suction filtration is effected via a double cloth filter until the filtrate no longer exhibits any sediment. After washing with additional toluene the sediment is weighed in the moist state. Then drying is effected at 70° C. in a drying cabinet and weighing is carried out again until the weight is constant. The swelling index (QI) is obtained from the ratio $$QI = \frac{\text{sediment(damp)}}{\text{sediment(dry)}}$$

The production of rubbers with such swelling indices is known in principle, the values required are adjusted by the use of suitable reaction conditions (eg. low reaction temperature or addition of molecular-weight regulators such as mercaptans).

The size of the rubber particles to be used in accordance with the invention may be varied within wide limits—eg. average particle diameters of about 50 nm to about 500 nm are possible in principle; preferred are rubber particles with average diameters from about 200 nm to about 400 nm, in particular from about 250 nm to about 350 nm. In this connection average particle diameters signify $d_{50}$ values which have been determined by ultracentrifuge measurement (cf. W. Scholtan and H. Lange in Kolloid-Z. and Z. Polymere 250, pages 782–796 (1972).

The graft-rubber particles according to the invention are produced by polymerisation of resin-forming monomers in the presence of the rubber which is available in latex form.

In this connection the graft polymerisation must be carried out in such a way that during 25 to 90%, preferably 30 to 80% and in particular 35 to 75% of the overall reaction time in the reaction mixture a quantity of 5 to 70 wt-%, preferably 7.5 to 60 wt-% and in particular 10 to 50 wt-% (relative to the total monomer employed up until the time in question) of non-reacted monomer is present.

Resin-forming monomers used in the production of graft rubber are preferably compounds with a vinyl group—eg. styrene, $C_1C_4$ alkyl-substituted styrenes, α-methylstyrene, acrylonitrile, methacrylonitrile, esters of acrylic acid and/or methacrylic acid with $C_1$–$C_8$ aliphatic or cycloaliphatic alcohols, N-substituted maleimide or mixtures thereof. Particularly preferred are mixtures of styrene and acrylonitrile, preferably in a weight ratio of 60:40 to 80:20, whereby styrene and/or acrylonitrile may be partially replaced by copolymerisable monomers, preferably by α-methylstyrene, methyl methacrylate or N-phenyl maleimide.

In addition, use may be made of molecular-weight regulators in the course of the graft polymerisation, preferably in quantities from 0.05 to 2 wt-%, in particular in quantities from 0.1 to 1 wt-% (in each case relative to the overall quantity of monomer in the graft-polymerisation reaction). Suitable molecular-weight regulators are, for example, n-dodecylmercaptan, t-dodecylmercaptan, dimeric α-methylstyrene.

Practically all substances that function as radical-forming agents enter into consideration as initiators. Examples of such substances are inorganic and organic peroxides—eg. $H_2O_2$, di-tert.-butyl peroxide, cumene hydroperoxide, dicyclohexyl percarbonate, tert.-butyl hydroperoxide, p-methane hydroperoxide, azo initiators such as azo-bis-isobutyronitrile, inorganic persalts such as ammonium, sodium, or potassium persulphate, potassium perphosphate, sodium perborate and also redox systems consisting of an oxidising agent, which as a rule is organic, and a reducing agent, whereby in addition heavy-metal ions are preferably present in the reaction medium (see H. Logemann in Houben-Weyl, Methoden der Organischen Chemie, Volume 14/1, pages 263 to 297).

Preferred initiators are ammonium, sodium and potassium persulphate, potassium persulphate being particularly preferred.

The reaction temperature during the production of the graft rubber is 30° to 150° C., preferably 40° to 90° C.

By way of emulsifiers, use may be made of the customary anionic emulsifiers such as alkyl sulphates, alkyl sulphonates, aralkyl sulphonates, soaps of alkaline disproportionated or hydrated abietic or talloleic acids, soaps of saturated or unsaturated fatty acids, emulsifiers based on compounds with cyclic hydrocarbon skeletons according to DE-OS 3 919 548 and DE-OS 3 925 634, use being made preferably of emulsifiers with carboxyl groups (eg. salts of $C_{10}$–$C_{18}$ fatty acids, salts of disproportionated abietic acid).

With a view to producing the graft-rubber particles with the structure according to the invention, 40 to 90 parts by weight, preferably 45 to 85 parts by weight and in particular 50 to 80 parts by weight of a resin-forming monomer, preferably of a mixture of styrene and acrylonitrile which optionally may contain up to 50 wt-% (relative to the total quantity of monomers used in the graft polymerisation) of one or more comonomers, are polymerised in the presence of 10 to 60 parts by weight, preferably 15 to 55 parts by weight and in particular 20 to 50 parts by weight (in each case relative to solids) of a rubber latex, preferably a polybutadiene latex, while observing the conditions described above.

With the use of mixtures of styrene and acrylonitrile by way of resin-forming monomers, these are preferably used in a weight ratio of 90:10 to 50:50, in particular in a weight ratio of 65:35 to 75:25, whereby styrene and/or acrylonitrile may be partially replaced by copolymerisable monomers, preferably by α-methylstyrene, methyl methacrylate or N-phenyl maleimide.

The structure of the graft-rubber particles can be detected by processes employing a transmission electron microscope (eg, after contrasting using osmium tetroxide—cf., for example, J. A. Manson, L. H. Sperling: Polymer Blends and Composites (Plenum Press, New York/London, 1976), pages 57–58 and literature quoted therein). In this connection the rubber phase of the graft-rubber particles in the electron-microscope photographs (that is, in the image of the sectional plane) must contain irregular cellular inclusions of the resin-forming polymer and exhibit an irregularly jagged structure on the particle surface. For each particle there must be 5 to 30, preferably 7 to 25 and in particular 10 to 20 jagged projections present which differ from an idealised round particle (with a particle diameter d) by virtue of a diameter d+d/x with x=3 to 15, preferably 4 to 12 and in particular 5 to 10.

Schematically:

In principle the graft-rubber polymers according to the invention can be produced in such a way that the matrix resin is formed during the graft polymerisation in the form of nongrafted polymer, but the graft-rubber polymers according to the invention are preferably blended with at least one thermoplastic rubber-free vinyl resin.

This can be done in various ways. If the vinyl resin itself was produced by emulsion polymerisation, the latices can be mixed and jointly precipitated and processed.

If the vinyl resin was produced by solution polymerisation or mass polymerisation, the graft polymer must be isolated by means of known processes, for example by spray drying or by addition of salts and/or acids, washing of the precipitates and drying of the powder and then mixed with the vinyl resin (preferably on multi-roll mills, mixing extruders or internal kneaders); this method is preferably adopted.

By way of vinyl resins, use is preferably made of copolymers of styrene and acrylonitrile in a weight ratio of 90:10 to 50:50, whereby the styrene may be entirely or partially replaced by α-methylstyrene and/or methyl methacrylate; optionally, concomitant use in a proportion of up to 30 wt-%, relative to vinyl resin, may be made of a further monomer chosen from the group constituted by maleic anhydride, maleimide, N-(cyclo)-alkylmaleimide, N-(alkyl)-phenylmaleimide.

Particulars regarding the production of these resins are described, for example, in DE-AS 2 420 358 and DE-AS 2 724 360. Vinyl resins produced by mass polymerisation or solution polymerisation have proved to be particularly useful.

In principle, in addition to one or more thermoplastic vinyl resins, further thermoplastic resins may also be contained in the moulding compounds according to the invention.

Examples of such thermoplastic resins are aromatic polycarbonates, aromatic polyester carbonates, polyesters, polyamides.

Suitable thermoplastic polycarbonates or polyester carbonates are known (cf., for example, DE-AS 1 495 626, DE-OS 2 232 877, DE-OS 2 703 376, DE-OS 2 714 544, DE-OS 3 000 610, DE-OS 3 832 396, DE-OS 3 077 934) which can be produced, for example, by reaction of diphenols of the formulae (I) and (II)

where
A is a single bond, $C_1$–$C_5$ alkylene, $C_2$–$C_5$ alkylidene, $C_5$–$C_6$ cycloalkylidene, —O—, —S—, —SO—, —SO$_2$— or —CO—, $R^5$ and $R^6$ stand, independently of one another, for hydrogen, methyl or halogen, in particular hydrogen, methyl, chlorine or bromine, $R^1$ and $R^2$ signify, independently of one another, hydrogen, halogen, preferably chlorine or bromine, $C_1$–$C_8$ alkyl, preferably methyl, ethyl, $C_5$–$C_6$ cycloalkyl, preferably cyclohexyl, $C_6$–$C_{10}$ aryl, preferably phenyl, or $C_7$–$C_{12}$ aralkyl, preferably phenyl-$C_1$–$C_4$-alkyl, in particular benzyl, m is an integer from 4 to 7, preferably 4 or 5, n is 0 or 1, $R^3$ and $R^4$ can be selected individually for each X and signify, independently of one another, hydrogen or $C_1$–$C_6$ alkyl and X signifies carbon, with carbonic acid halides, preferably phosgene, and/or with aromatic dicarboxylic acid dihalides, preferably benzene dicarboxylic dihalides, according to the phase-interface process or with phosgene according to the process in homogeneous phase (the so-called pyridine process), whereby the molecular weight can be adjusted in known manner by a suitable quantity of known chain-reaction terminators.

Suitable diphenols of the formulae (I) and (II) are, for example, hydroquinone, resorcin, 4-4'-dihydroxydiphenyl, 2, 2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl) cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxyphenyl)-2,4, 4-trimethylcyclopentane.

Preferred diphenols of the formula (I) are 2,2-bis-(4-hydroxyphenyl)-propane and 1,1-bis-(4-hydroxyphenyl) cyclohexane, preferred phenol of the formula (II) is 1, 1-bis-(4-hydroxyphenyl)-3,5,5-trimethylcyclohexane.

Use may also be made of mixtures of diphenols.

Suitable chain-reaction terminators are, for example, phenol, p-tert.-butylphenol, long-chain alkyl phenols such as 4-(1,3-tetramethyl-butyl)-phenol according to DE-OS 2 842 005, monoalkyl phenols, dialkyl phenols with a total of 8 to 20 C atoms in the alkyl substituents according to DE-OS 3 506 472, such as p-nonylphenol, 2,5-di-tert.-butylphenol, p-tert.-octylphenol, p-dodecylphenol, 2-(3,5-dimethylheptyl)-phenol and 4-(3,5-dimethylheptyl)-phenol. The necessary quantity of chain-reaction terminators is generally 0.5 to 10 mol-%, relative to the sum of the diphenols (I) and (II).

The suitable polycarbonates or polyester carbonates may be linear or branched; branched products are preferably obtained by the incorporation of 0.05 to 2.0 mol-%, relative to the sum of the diphenols employed, of trifunctional compounds or compounds that are more than trifunctional—eg, those with three or more than three phenolic OH groups.

The suitable polycarbonates or polyester carbonates may contain aromatically bonded halogen, preferably bromine and/or chlorine; they are preferably halogen-free.

They have average molecular weights ($\overline{M}_w$, weight average) from 10,000 to 200,000, preferably from 20,000 to 80,000, determined, for example, by ultracentrifugation or scattered-light measurement.

Suitable thermoplastic polyesters are preferably polyalkylene terephthalates—that is, reaction products of aromatic dicarboxylic acids or their reactive derivatives (eg, dimethyl esters or anhydrides) and aliphatic, cycloaliphatic or arylaliphatic diols and mixtures of such reaction products.

Preferred polyalkylene terephthalates can be produced from terephthalic acids (or their reactive derivatives) and aliphatic or cycloaliphatic diols with 2 to 10 C atoms in accordance with known methods (Kunststoff-Handbuch, Volume VIII, page 695 ff, Carl Hanser Verlag, Munchen 1973).

In preferred polyalkylene terephthalates there are 80 to 100, preferably 90 to 100 mol-% of the dicarboxylic acid residues, terephthalic acid residues and 80 to 100, preferably 90 to 100 mol-% of the diol residues, ethylene glycol residues and/or butanediol-1,4 residues.

The preferred polyalkylene terephthalates may contain, in addition to ethylene glycol residues or butanediol-1,4 residues, 0 to 20 mol-% residues of other aliphatic diols with 3 to 12 C atoms or of cycloaliphatic diols with 6 to 12 C atoms—eg, residues of propanediol-1,3, 2-ethylpropanediol-1,3, neopentyl glycol, pentanediol-1,5, hexanediol-1,6, cyclohexanedimethanol-1,4, 3-methylpentanediol-1,3 and -1,6, 2-ethylhexanediol-1,3, 2,2-diethylpropanediol-1,3, hexanediol-2,5, 1,4,-di(β-hydroxyethoxy)-benzene, 2,2-bis-4-hydroxy-cyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 715 932).

The polyalkylene terephthalates may be branched by incorporation of relatively small quantities of 3- or 4-hydric alcohols or 3- or 4-basic carboxylic acids such as are described in DE-OS 1 900 270 and US-PS 3 692 744. Examples of preferred branching agents are trimesic acid, trimellitic acid, trimethylolethane, trimethylolpropane and pentaerythritol. It is advisable to use no more than 1 mol-% of the branching agent, relative to the acid component.

Particularly preferred are polyalkylene terephthalates that have been produced solely from terephthalic acid and the reactive derivatives thereof (eg, dialkyl esters thereof) and ethylene glycol and/or butanediol-1,4, and mixtures of these polyalkylene terephthalates.

Preferred polyalkylene terephthalates are also copolyesters produced from at least two of the alcohol components specified above: particularly preferred copolyesters are poly-(ethyleneglycolbutanediol-1,4)-terephthalates.

The preferred suitable polyalkylene terephthalates generally have an intrinsic viscosity of 0.4 to 1.5 dl/g, preferably 0.5 to 1.3 dl/g and in particular 0.6 to 1.2 dl/g, in each case measured in phenol/o-dichlorobenzene (1:1 parts by weight) at 25° C.

Suitable polyamides are known homopolyamides, copolyamides and mixtures of these polyamides. These may be partially crystalline and/or amorphous polyamides.

Suitable by way of partially crystalline polyamides are polyamide-6, polyamide-6,6, mixtures and corresponding copolymers formed from these components. There further enter into consideration partially crystalline polyamides, the acid component of which consists wholly or partially of terephthalic acid and/or isophthalic acid and/or suberic acid and/or sebacic acid and/or azelaic acid and/or adipic acid and/or cyclohexane dicarboxylic acid, the diamine component of which consists wholly or partially of m- and/or p-xylylene diamine and/or hexamethylene diamine and/or 2,2,4-trimethyl hexamethylene diamine and/or 2,2,4-trimethylhexamethylene diamine and/or isphorone diamine, and the composition of which is known in principle.

In addition, polyamides should be mentioned that are produced wholly or partially from lactams with 7–12 C atoms in the ring, optionally with concomitant use of one or more of the initial components specified above.

Particularly preferred partially crystalline polyamides are polyamide-6 and polyamide-6,6 and their mixtures. Use may be made of known products by way of amorphous polyamides. They are obtained by polycondensation of diamines such as ethylene diamine, hexamethylene diamine, decamethylene diamine, 2,2,4-and/or 2,4,4-trimethylhexamethylene diamine, m- and/or p-xylylene diamine, bis-(4-aminocyclohexyl)-methane, bis-(4-aminocyclohexyl)-propane, 3,3'-dimethyl-4,4'-diaminodicyclohexylmethane, 3-aminomethyl, 3,5,5-trimethylcyclohexylamine, 2,5- and/or 2,6-bis-(aminomethyl)-norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyl adipic acid, isophthalic acid and terephthalic acid.

Copolymers that are obtained by polycondensation of several monomers are also suitable, and also copolymers produced by addition of aminocarboxylic acids such as ε-aminocaproic acid, ω-aminoundecanoic acid or ω-aminolauric acid or their lactams.

Particularly suitable amorphous polyamides are the polyamides produced from isophthalic acid, hexamethylene diamine and other diamines such as 4,4'-diaminodicyclohexylmethane, isophorone diamine, 2,2,4- and/or 2,4,4-trimethylhexamethylene diamine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4-4'-diamino-dicyclohexylmethane and laurolactam; or from terephthalic acid and the isomer mixture of 2,2,4- and/or 2,4,4-trimethylhexamethylene diamine.

Instead of the pure 4,4'-diaminodicyclohexylmethane, mixtures of the positionally isomeric diaminodicyclohexyl methanes can also be used that are composed of 70 to 99 mol-% of the 4-4' diamino isomer 1 to 30 mol-% of the 2-4' diamino isomer 0 to 2 mol-% of the 2,2' diamino isomer and, optionally, of correspondingly higher condensed diamines obtained by hydration of diaminodiphenylmethane of technical quality. The isophthalic acid may be replaced up to 30% by terephthalic acid.

The polyamides preferably exhibit a relative viscosity (measured with respect to a 1 wt-% solution in m-cresol at 25° C.) of 2.0 to 5.0, in particular of 2.5 to 4.0.

The proportion of the graft rubber in the moulding compounds according to the invention can be varied within wide limits; it preferably amounts to 20 to 90 wt-%, in particular 30 to 85 wt-%.

To the moulding compounds according to the invention there may be added in the course of production, processing, further processing and final moulding the necessary or appropriate additives—eg, anti-oxidants, UV stabilisers, peroxide decomposers, anti-static agents, lubricants, mould-release agents, flameproofing agents, fillers or reinforcing materials (glass fibres, carbon fibres, etc), colouring agents.

The final moulding may be carried out using commercial processing aggregates and comprises, for example, injection-moulding processing, slab extrusion with, optionally, subsequent hot moulding, cold moulding, extrusion of pipes and sections, calender processing.

In the following examples the parts specified are always parts by weight and the specified percentages are always percentages by weight, unless otherwise stated.

EXAMPLES

Graft Rubbers

Graft Rubber A (According to the Invention)

40 parts by weight (reckoned as solid matter) of an anionically emulsified polybutadiene latex produced by radical polymerisation with a $d_{50}$ value of 284 nm and a swelling index of 59 are brought with water to a solids content of about 20 wt-%, after which heating is effected to 63° C. and mixing is effected with 0.5 parts by weight potassium peroxoisulphate (dissolved in water).

Then 60 parts by weight of a mixture of 72 wt-% styrene and 28 wt-% acrylonitrile and 0.1 parts by weight tert.-dodecylmercaptan are charged within 4 h in such a way that in the course of the polymerisation reaction the following contents of non-reacted monomer resulted in the reaction mixture (determined by sampling, addition of phenothiazine, coagulation of the polymer portion and calculation of the unreacted quantity of monomer):

| Time of sample (mins after start of reaction) | Proportion of non-reacted monomer in the reaction mixture (wt-% relative to each monomer quantity charged) |
|---|---|
| 20 | 8.4 |
| 40 | 14.2 |
| 60 | 19.2 |
| 80 | 20.1 |
| 100 | 18.3 |
| 120 | 16.1 |
| 140 | 13.6 |
| 160 | 11.0 |
| 180 | 7.4 |
| 200 | 2.1 |
| 220 | 1.1 |
| 240 | 2.0 |
| 260 | 0.8 |
| 280 | 0.7 |
| 300 | 0.5 |

At the same time as the monomers there is charged within 4 h 1 part by weight (reckoned as solid substance) of the sodium salt of a resin-acid mixture (Dresinate 731, dissolved in water that has been adjusted to be alkaline) by way of emulsifier. After a 1-hour post-reaction time the graft rubber is coagulated after addition of about 1.0 parts by weight of a phenolic anti-oxidant with a mixture of aqueous magnesium sulphate solution and acetic acid; after washing with water the resulting powder is dried at 70° C in a vacuum.

Graft Rubber B (According to the Invention)

35 parts by weight (reckoned as solid matter) of an anionically emulsified polybutadiene latex produced by radical polymerisation with a $d_{50}$ value of 306 nm and a swelling index of 53 are brought with water to a solids content of about 20 wt-%, after which heating is effected to 63° C. and mixing is effected with 0.5 parts by weight potassium peroxodisulphate (dissolved in water).

Then 65 parts by weight of a mixture of 73 wt-% styrene and 27 wt-% acrylonitrile and 0.15 parts by weight tert.-dodecylmercaptan are charged within 4 h in such a way that in the course of the polymerisation reaction the following contents of non-reacted monomer resulted in the reaction mixture:

| Time of sample (mins after start of reaction) | Proportion of non-reacted monomer in the reaction mixture (wt-% relative to each monomer quantity charged) |
|---|---|
| 20 | 10.5 |
| 40 | 15.2 |
| 60 | 22.7 |
| 80 | 21.9 |
| 100 | 20.4 |
| 120 | 18.1 |
| 140 | 14.8 |
| 160 | 12.1 |
| 180 | 9.0 |
| 200 | 6.2 |
| 220 | 3.6 |
| 240 | 2.4 |
| 260 | 1.9 |
| 280 | 1.0 |
| 300 | 0.6 |

At the same time as the monomers there is charged within 4 h 1 part by weight (reckoned as solid substance) of the sodium salt of a resin-acid mixture (Dresinate 731, dissolved in water that has been adjusted to be alkaline) by way of emulsifier. After a 1-hour post-reaction time the graft rubber is processed as described under A.

Graft Rubber C (Not According to the Invention)

The reaction described under "Graft rubber A" was repeated, whereby use was made of a polybutadiene latex with a $d_{50}$ value of 285 nm and a swelling index of 20.

Graft Rubber D (Not According to the Invention)

The reaction described under "Graft rubber A" was repeated, whereby the monomers were charged in such a way that in the course of the polymerisation reaction the following contents of non-reacted monomer resulted in the reaction mixture:

| Time of sample (mins after start of reaction) | Proportion of non-reacted monomer in the reaction mixture (wt-% relative to each monomer quantity charged) |
|---|---|
| 20 | 4.1 |
| 40 | 5.2 |
| 60 | 4.3 |
| 80 | 3.9 |
| 100 | 4.6 |
| 120 | 4.5 |
| 140 | 4.5 |
| 160 | 4.1 |
| 180 | 4.0 |
| 200 | 4.9 |
| 220 | 5.1 |
| 240 | 4.7 |
| 260 | 3.1 |
| 280 | 2.0 |
| 300 | 0.6 |

ABS Moulding Compounds

The graft rubbers described above were mixed with a styrene/acrylonitrile copolymer resin (weight ratio styrene:acrylonitrile=72:28, $\overline{M}_w$=115,000, $\overline{M}_w/\overline{M}_n-1 \leq 2$) in the proportions specified in Table 1, 2 parts by weight ethylenediamine-bis-stearylamide and 0.1 parts by weight of a silicone oil in an internal kneader and after granulation by injection-moulding were processed into test rods and a flat sheet (for assessing the surface).

The following data were determined:

Impact strength at room temperature ($a_k^{RT}$) and at $-40°$ C. ($a_k^{-40° C.}$) according to ISO 180/1A (unit kJ/m$^2$), ball-pressure hardness $H_c$ according to DIN 53 456 (unit: N/mm$^2$), dimensional stability when subject to heat (Vicat B) according. to DIN 53 460 (unit: °C.), flow characteristics MVI according to DIN 53 735U (unit: cm$^3$/10 min) and lustre characteristics according to DIN 67 530 with a refection angle of 60° (reflectometer value).

The mixing ratios and the results are compiled in Table 1.

Figure 1A:
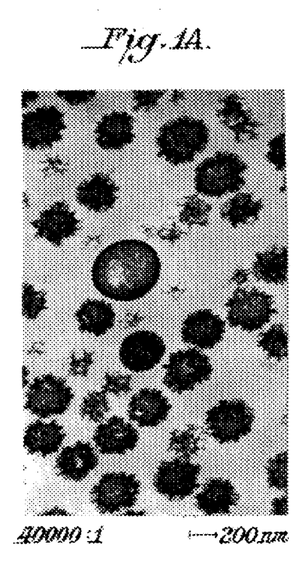
Figure 1B:
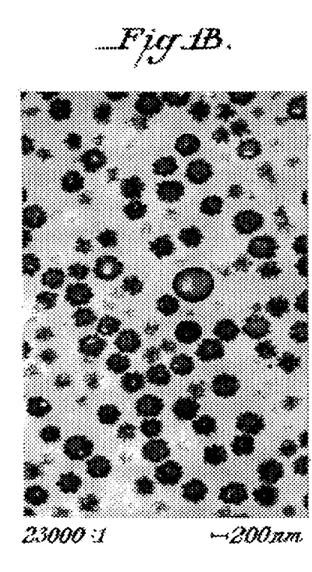
Figure 1C:
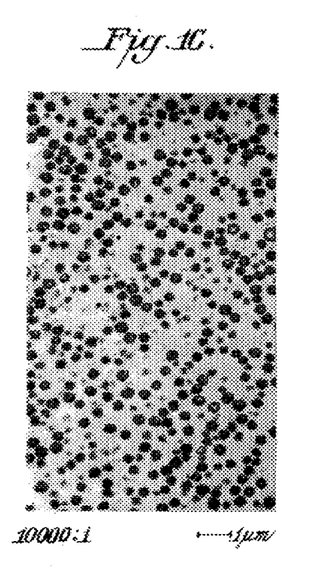
Figure 2A:
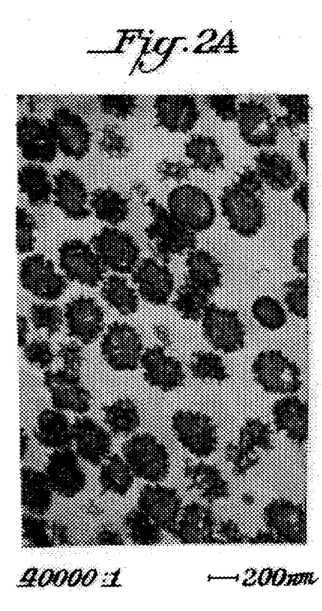
Figure 2B:
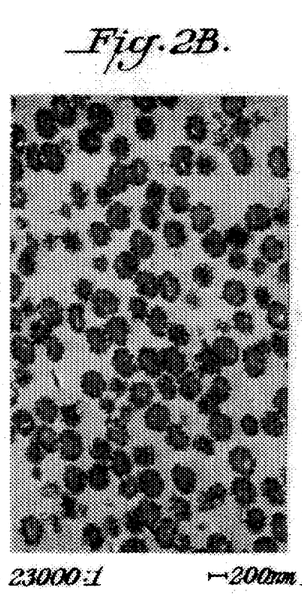
Figure 2C:
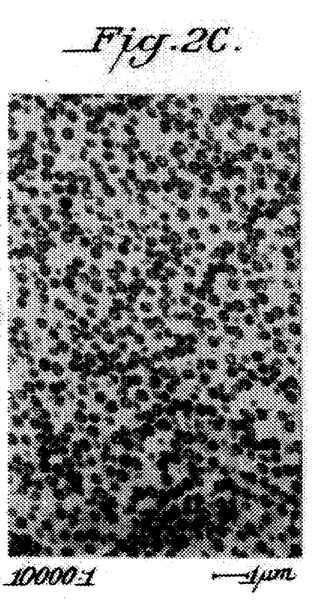
Figure 3A:
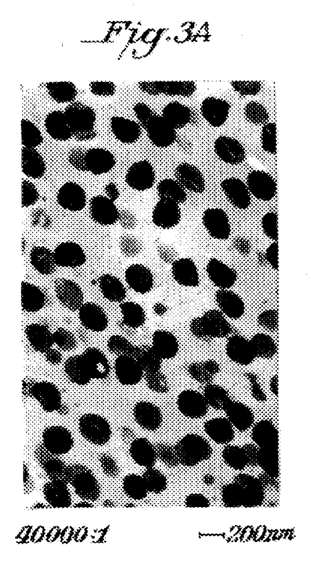
Figure 3B:
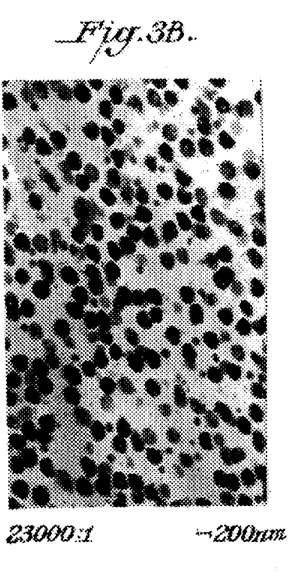
Figure 3C:
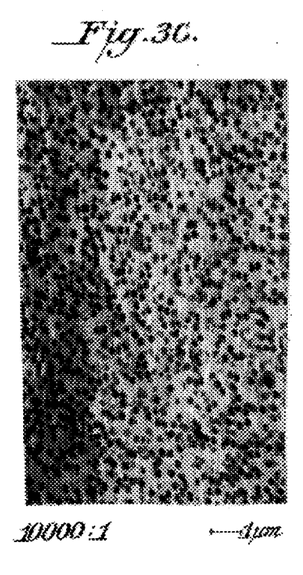
Figure 4A:
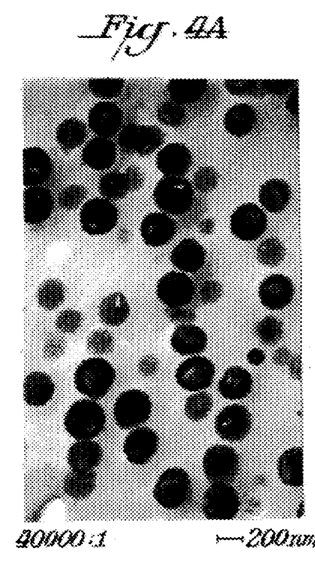
Figure 4B:
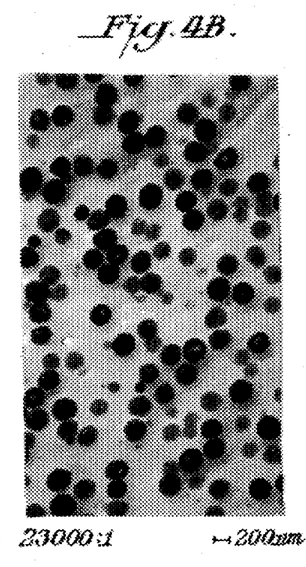
Figure 4C:
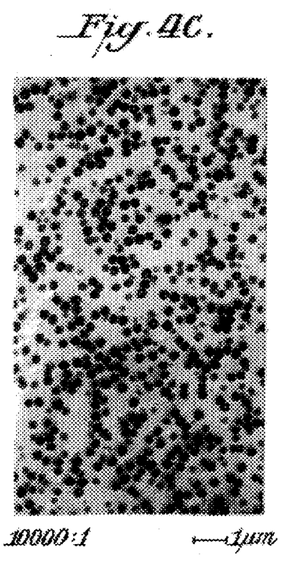
Figure 5A:
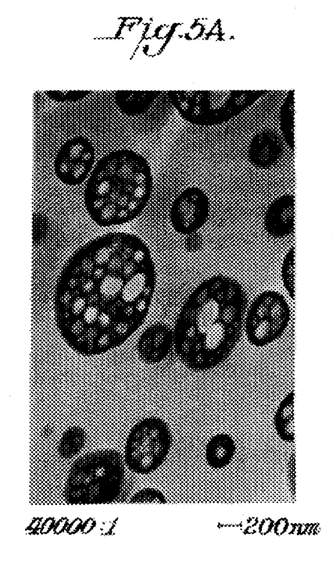
Figure 5B:
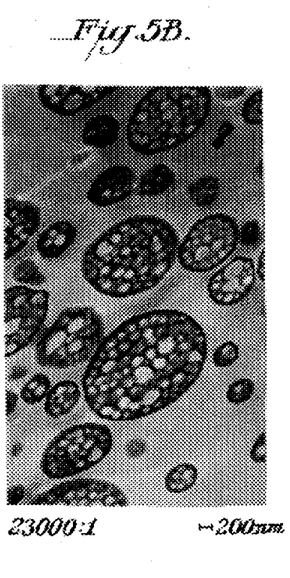
Figure 5C:
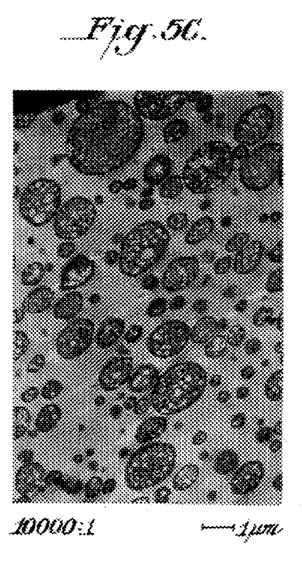

From the moulding compounds with a rubber content of 14 wt-% (Examples 1, 3, 5, 7 and for the comparison of the compound ABS 9), electron-microscope photographs were taken (contrasting using osmium tetroxide) (Illustrations 1 to 5).

It can be seen that the moulding compounds according to the invention with the special jagged structure of the rubber phase of the graft-rubber particles possess outstanding mechanical properties, even with relatively low rubber contents—ie, with rubber contents such as are usually exhibited by ABS polymers produced by mass polymerisation.

TABLE 1

Compositions and test data of the moulding materials investigated

| Example | Graft rubber used | Quantity of graft rubber [parts-wt] | Styrene-acrylonitrile copolymer [parts-wt] | Rubber content [wt-%] | $a_k^{RT}$ [kJ/m$^2$] | $a_k^{-40°C}$ [kJ/m$^2$] | $H_c$ [N/mm$^2$] | Vicat B [°C] | MVI [cm$^3$/10 min] | Degree of lustre |
|---|---|---|---|---|---|---|---|---|---|---|
| 1 | A | 35 | 65 | 14 | 35 | 17 | 101 | 102 | 9.5 | 86 |
| 2 | A | 55 | 45 | 22 | 44 | 25 | 83 | 100 | 4.4 | 83 |
| 3 | B | 40 | 60 | 14 | 37 | 19 | 99 | 103 | 7.9 | 92 |
| 4 | B | 62.9 | 37.1 | 22 | 45 | 28 | 78 | 97 | 6.3 | 78 |
| 5 (comp.) | C | 35 | 65 | 14 | 18 | 11 | 105 | 99 | 8.1 | 85 |
| 6 (comp.) | C | 55 | 45 | 22 | 26 | 19 | 91 | 98 | 7.1 | 81 |
| 7 (comp.) | D | 35 | 65 | 14 | 23 | 13 | 100 | 101 | 8.1 | 81 |
| 8 (comp.) | D | 55 | 45 | 22 | 31 | 20 | 84 | 96 | 4.8 | 78 |
| 9 mass ABS Dow Magnum 3904 (comp.) | | | | 14 | 33 | 14 | 83 | 97 | 5.0 | 56 |

We claim:

1. Moulding compounds consisting of at least one resin matrix and a particulate graft-rubber polymer distributed therein and produced by emulsion polymerisation, characterised in that at least 70% of the graft-rubber particles (number) exhibit a structure of the rubber phase which can be detected by photographs taken with the aid of a transmission electron microscope and in which the individual particles contain irregular cellular inclusions of resin-forming polymer and the surface of the particles exhibits an irregularly jagged structure such that, for each particle illustrated, 5 to 30 of such jagged projections are present which differ from an idealised round particle (with a diameter d) by virtue of a diameter d+d/x with x=3 to 15.

2. Moulding compounds according to claim 1, characterised in that at least 80% of the graft-rubber particles (number) exhibits a structure of the rubber phase which can be detected by photographs taken with the aid of a transmission electron microscope and in which the individual particles contain irregular cellular inclusions of resin-forming polymer and the surface of the particles exhibits an irregularly jagged structure such that, for each particle illustrated, 7 to 25 of such jagged projections are present which differ from an idealised round particle (with a diameter d) by virtue of a diameter d+d/x with x=4 to 12.

3. Moulding compounds according to claim 1, characterised in that the graft-rubber particles consist of polybutadiene and grafted-on copolymer of styrene and acrylonitrile.

4. Moulding compounds according to claim 1, characterised in that the resin matrix is constructed from at least two monomer components selected from the group consisting of styrene, α-methylstyrene, acrylonitrile, methyl methacrylate, and N-phenylmaleimide.

5. Moulding compounds according to claim 4, containing at least one additional thermoplastic resin component selected from the group consisting of aromatic polycarbonate, aromatic polyester carbonate, polyester, and polyamide.

6. A process for the production of graft rubbers with a structure described in claim 1 by graft polymerisation of resin-forming monomers in the presence of at least one rubber that is available in emulsion form with a swelling index $\geq 30$ (in toluene) in such a way that during 25 to 90% of the overall reaction time in the reaction mixture a quantity of 5 to 70 wt-% (relative to the total monomer employed up until the time in question) of non-reacted monomer is present.

7. A process for the production of graft rubbers with a structure described in claim 1 by graft polymerisation of resin-forming monomers in the presence of at least one rubber that is available in emulsion form with a swelling index $\geq 40$ (in toluene) in such a way that during 30 to 80% of the overall reaction time in the reaction mixture a quantity of 7.5 to 60 wt-% (relative to the overall monomer employed up until the time in question) of non-reacted monomer is present.

8. A process for the production of graft rubbers according to claim 6, characterised in that use is made of polybutadiene by way of rubber that is available in emulsion form and use is made of mixtures of styrene and acrylonitrile by way of monomers.

* * * * *